United States Patent
Vigneras

(10) Patent No.: US 9,831,046 B2
(45) Date of Patent: *Nov. 28, 2017

(54) COVER FOR CONNECTING ENERGY STORAGE ASSEMBLIES

(75) Inventor: Erwan Vigneras, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 248 days.

This patent is subject to a terminal disclaimer.

(21) Appl. No.: 14/241,440

(22) PCT Filed: Aug. 29, 2012

(86) PCT No.: PCT/EP2012/066732
§ 371 (c)(1),
(2), (4) Date: Feb. 26, 2014

(87) PCT Pub. No.: WO2013/030212
PCT Pub. Date: Mar. 7, 2013

(65) Prior Publication Data
US 2015/0022950 A1   Jan. 22, 2015

(30) Foreign Application Priority Data
Aug. 29, 2011 (FR) ...................... 11 57604

(51) Int. Cl.
*H01G 11/82* (2013.01)
*H01G 11/08* (2013.01)
(Continued)

(52) U.S. Cl.
CPC .......... *H01G 11/82* (2013.01); *B23K 20/129* (2013.01); *H01G 2/04* (2013.01); *H01G 9/06* (2013.01);
(Continued)

(58) Field of Classification Search
CPC ........ H01G 11/82; H01G 11/58; H01G 11/08; H01G 11/84; H01G 9/145; H01G 9/06
See application file for complete search history.

(56) References Cited

U.S. PATENT DOCUMENTS

| 1,723,727 A | 3/1927 | Eckstein |
| 3,150,300 A | 9/1964 | Schils et al. |

(Continued)

FOREIGN PATENT DOCUMENTS

| DE | 42 13 651 A1 | 10/1993 |
| EP | 2 110 824 A1 | 10/2009 |

(Continued)

OTHER PUBLICATIONS

Non-Final Office Action in U.S. Appl. No. 14/241,439 dated Nov. 4, 2015. 19 pages.

(Continued)

*Primary Examiner* — David M Sinclair
(74) *Attorney, Agent, or Firm* — Blakely Sokoloff Taylor & Zafman LLP

(57) ABSTRACT

The invention relates to a cover for covering a tubular element of a first electrical energy storage assembly (20), said cover comprising a covering wall (50). The cover is characterized in that it comprises a radially extending electroconductive tongue (60, 70) comprising a contact face (71) intended to come into contact with a second adjacent storage assembly in order to electrically connect the two storage assemblies.

19 Claims, 4 Drawing Sheets

(51) Int. Cl.
  *H01G 9/06*   (2006.01)
  *H01G 2/04*   (2006.01)
  *H01G 9/145*  (2006.01)
  *H01G 11/58*  (2013.01)
  *H01G 11/84*  (2013.01)
  *B23K 20/12*  (2006.01)

(52) U.S. Cl.
  CPC ............ *H01G 9/145* (2013.01); *H01G 11/08* (2013.01); *H01G 11/58* (2013.01); *H01G 11/84* (2013.01); *Y02E 60/13* (2013.01)

(56) References Cited

U.S. PATENT DOCUMENTS

| | | | |
|---|---|---|---|
| 3,386,014 | A | 5/1968 | Burger et al. |
| 4,581,306 | A | 4/1986 | Hasenauer et al. |
| 6,456,484 | B1 | 9/2002 | Matsuoka et al. |
| 6,605,382 | B2 | 8/2003 | Ruth et al. |
| 8,568,915 | B2 | 10/2013 | Fuhr et al. |
| 2005/0054240 | A1 | 3/2005 | Kubota et al. |
| 2007/0053140 | A1 | 3/2007 | Soliz |
| 2007/0084043 | A1 | 4/2007 | Hosking |
| 2008/0182168 | A1 | 7/2008 | Byun et al. |
| 2009/0104516 | A1 | 4/2009 | Yoshihara et al. |
| 2009/0123830 | A1 | 5/2009 | Kato et al. |
| 2009/0208836 | A1* | 8/2009 | Fuhr ............... H01M 2/024 429/158 |
| 2010/0079927 | A1 | 4/2010 | Shimizu et al. |
| 2011/0038101 | A1 | 2/2011 | Caumont et al. |
| 2011/0081568 | A1 | 4/2011 | Kim et al. |
| 2011/0236733 | A1 | 9/2011 | Lee et al. |
| 2012/0114989 | A1* | 5/2012 | Caumont ......... H01G 9/10 429/61 |
| 2012/0218680 | A1 | 8/2012 | Wetherill et al. |
| 2012/0236466 | A1 | 9/2012 | Iida et al. |
| 2013/0149919 | A1 | 6/2013 | Lee et al. |

FOREIGN PATENT DOCUMENTS

| | | |
|---|---|---|
| FR | 2 894 381 A1 | 6/2007 |
| FR | 2 916 306 A1 | 11/2008 |
| FR | 2 921 195 | 3/2009 |
| FR | 2 921 203 A1 | 3/2009 |
| FR | 2 927 729 | 8/2009 |
| JP | 2000-149907 A | 5/2000 |
| JP | 2003-133715 A | 5/2003 |
| JP | 2004 171856 A | 6/2004 |
| WO | WO-2005061171 A1 | 7/2005 |
| WO | WO 2007/064089 A1 | 6/2007 |
| WO | WO 2010/041461 | 4/2010 |
| WO | WO 2011/111721 A1 | 9/2011 |

OTHER PUBLICATIONS

Non-Final Office Action in U.S. Appl. No. 14/241,441 dated Nov. 16, 2015. 19 pages.
Search Report in French Application No. 1157605 dated Feb. 29, 2012. 7 pages.
Final Office Action in U.S. Appl. No. 14/241,439 dated May 24, 2016. 16 pages.
Final Office Action in U.S. Appl. No. 14/241,441 dated Jun. 21, 2016. 18 Pages.

* cited by examiner

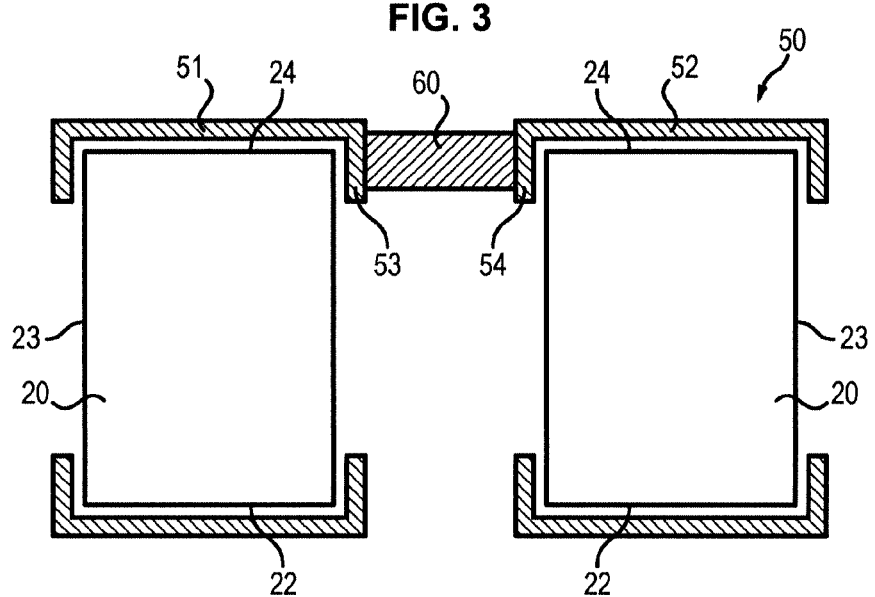
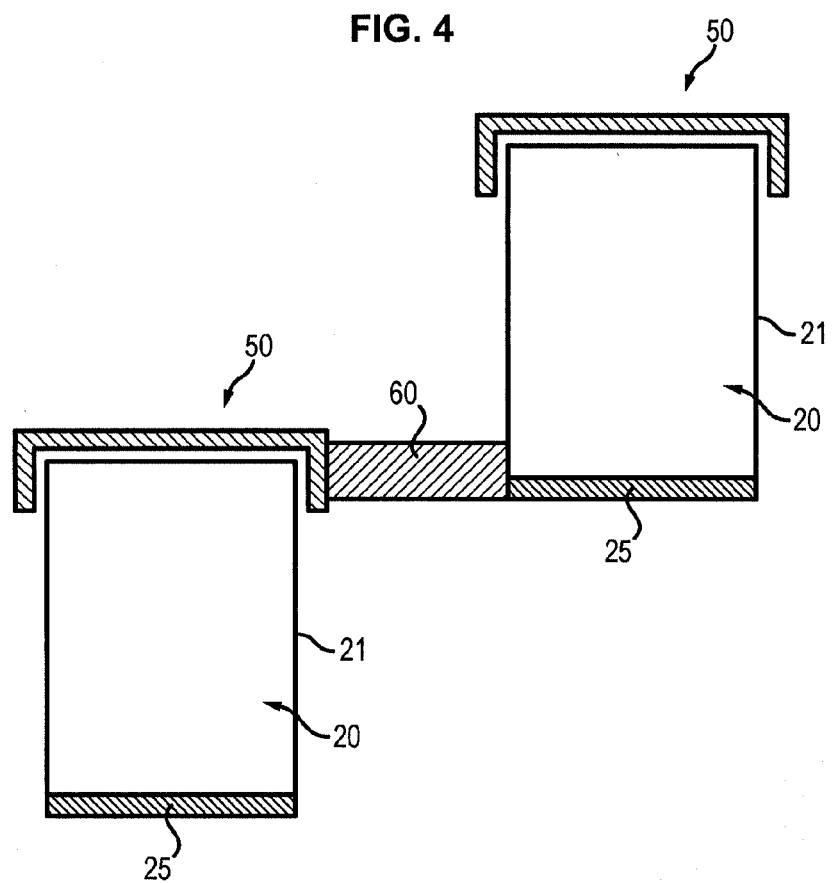

COVER FOR CONNECTING ENERGY STORAGE ASSEMBLIES

The present invention concerns the general technical field of electrical energy storage assemblies.

More particularly the invention concerns the field of modules comprising at least two electrical energy storage assemblies.

In the present invention by <<electrical energy storage assembly>> is meant either a capacitor (i.e. a passive system comprising two electrodes and an insulator) or a supercapacitor (i.e. a system comprising at least two electrodes, an electrolyte and at least one separator) or a battery of lithium battery type (i.e. a system comprising at least one anode, at least one cathode and an electrolyte solution between the anode and cathode).

GENERAL PRESENTATION OF THE PRIOR ART

Modules are known such as illustrated in FIG. 1 comprising a casing 110 in which there are arranged several electrical energy storage assemblies 120.

Each storage assembly is of tubular supercapacitor type for example.

It comprises a housing such as a tubular element, a capacitive winding and a liquid electrolyte inside the housing. The storage assembly also comprises two covers to close the two ends of the housing. Each cover 130 is electrically connected to the capacitive winding.

Inside the module, the storage assemblies 120 are alternately connected in pairs at their upper and lower ends using connector strips 140.

Each cover 130 comprises a connection terminal 131 capable of coming into contact with a through-bore of the connector strip 140.

The connecting of the covers 130 with the connector strip of two adjacent storage assemblies 120 is obtained by press-fitting the strip 140 onto the connection terminals 131 of the covers 130, or by laser or other welding edge-to-edge between the strip 140 and the terminals 131, or by screwing or using these different techniques in combination.

However, these connecting techniques between strip and cover i.e. press-fitting, welding or screwing) firstly require tight tolerances of the terminals and strips and secondly require precise aligning of the parts with each other to ensure the manufacture of an end module of quality, hence a high manufacturing cost.

Modules are also known in which the storage assemblies are connected in pairs using a longitudinal single unit part—called a bi-cover—forming both a cover and connector strip. Said longitudinal part is described in particular in document FR 2 894 381.

The use of a bi-cover for the electrical connection of two adjacent storage assemblies allows an increase in the electrical and thermal performance of the modules. More specifically:

regarding electrical performance, the use of a single unit bi-cover (i.e. an element in a single piece having the functions of cover and strip) allows a reduction in the internal resistance of the connection means: for the connection of two storage assemblies using a connector strip, the electric current is compelled to pass through weld regions of limited size;

regarding thermal performance, the use of a single unit bi-cover allows an increase in the contact surface between the energy storage assemblies and the walls of the module which promotes heat diffusion towards the upper part 111 of the casing 110.

However, it is not possible to use solely bi-covers to connect together all the storage assemblies of a module. This would effectively require the impregnation of the assemblies after completing the assembling of the module since the bi-cover which allows this assembling is also used to ensure the sealing of each of the assemblies. This makes the process most complex. It is therefore necessary, in addition to the use of bi-covers, to use connector strips and standard covers for the electrical connecting together of the storage assemblies. For example, the bi-covers are used for the electrical connection of the bottom surfaces of the different storage assemblies, and covers and strips illustrated in FIG. 1 for the electrical connection of the top surfaces of these storage assemblies.

Assembling is therefore complex due to the need to use three types of different parts (i.e. cover, strip and bi-covers).

In addition this solution does not allow optimized compactness of the module obtained on account of the presence of the covers and strips illustrated in FIG. 1 on one surface of the storage assemblies.

It is one object of the present invention to propose a solution to the assembling problems of the aforementioned modules, namely a technical solution allowing more compact assembling of modules, this assembling being easier to implement than the prior art solutions.

PRESENTATION OF THE INVENTION

For this purpose, a cover is provided intended to cap a tubular element of a first electrical energy storage assembly, the cover comprising a covering wall, noteworthy in that the cover comprises an electrically conductive tongue extending radially, said tongue comprising a contact face intended to come into contact with a second adjacent storage assembly for the electrical connection of the two storage assemblies.

The electrically conductive tongue extends projects radially from the covering wall. The covering wall is the wall delimiting an axial end of the storage assembly and intended to cover a capacitor element and optionally a tubular element surrounding this capacitor element.

Said cover, without increasing the number of assembly steps, allows the electrical connection of two energy storage assemblies whilst obtaining minimum bulk of the two joined assemblies.

Preferred but non-limiting aspects of the cover according to the invention are the following:

the cover comprises at least one side wall essentially normal to the covering wall, the radial tongue being arranged on this or at least one of these side walls;

the cover notably comprises a peripheral skirt extending over the periphery of the covering wall and intended to surround a tubular element of the assembly, the tongue being arranged on the peripheral skirt;

it may also form a disc comprising the covering wall and intended to be inserted in the tubular element of the assembly the radial tongue being arranged on one side wall of the disc;

the electrically conductive tongue is separate from the covers of the second assembly before the electrical connecting of the two storage assemblies, the contact face of the tongue being intended to be connected to:
the cover of the second storage assembly, in particular the peripheral skirt of the cover; and/or
the tubular element of the second storage assembly;

the contact face of the tongue has a shape which mates with the shapes of the cover or of the tubular element with which said contact face is intended to come into contact. It is located at the free radial end of the tongue;

the contact face is concave;

the tongue comprises a cradle on its contact face, the cradle being intended to be secured e.g. by interlocking onto a support of the second storage assembly, the cradle and the support having matching shapes;

the cradle comprises a tenon or a mortise and the support comprises a mortise or a tenon;

the ends of the tongue in the direction normal to the covering wall are located between the ends of the reminder of the cover in this direction, in particular of the side wall of the cover, such that the peripheral skirt or the side wall of the disc. In other words, the height of the tongue is equal to or shorter than the height of the cover, the height of the side wall in particular such as the skirt. For example, the height of the tongue is equal to one, half of the height of the cover, of the skirt in particular;

the ends of the tongue in at least one other direction along the plane of the covering wall are located between the ends of the covering wall in this direction. In other words, the width of the tongue is equal to or narrower than the corresponding dimension of the cover, in particular the diameter of the cover. The bulk of the tongue is thereby reduced i.e. of the member sued to connect with the other storage assembly and the capacitance of the module is increased;

the tongue and covering wall extend along one same plane;

the tongue extends outwardly at the end of the side wall opposite the side wall connected to the covering wall, in particular at the free end of the skirt parallel to the covering wall.

A further object of the invention is an energy storage assembly comprising a tubular element having a side face and at least one cover intended to cap one of the ends of the tubular element the cover comprising a covering wall intended to cover said end of the tubular element, the cover being a cover of the invention.

This energy storage assembly may comprise a tube having a bottom and closed at one end by a cover of the invention. The storage assembly may also comprise a tube open at its two ends and closed using a cover of the invention at one or at both its end. The tongues of the two covers may then protrude from the assembly in one same direction or in two different directions e.g. opposite directions.

If the cover forms a disc such as indicated above, it is intended to be inserted in the tubular element, this element also possibly comprising a cut-out whose shape mates with the shape of the cross-section of the corresponding tongue to allows the tongue to pass. Said may evidently comprise several cut-outs forming a passageway for each radial tongue of the corresponding cover.

If the cover comprises a skirt such as indicated above, this skirt is intended to surround the tubular element of the assembly.

The invention also comprises a module comprising at least two electrical energy storage assemblies, each storage assembly comprising:

a tubular element having a so-called side face;

at least one cover intended to cap one of the ends of the tubular element, the cover comprising a covering wall intended to cover said end of the tubular element, noteworthy in that at least one of the storage assembles is an assembly of the invention, the tongue of said cover or covers forming a connecting body allowing the electrical connection of the two assemblies.

In the present invention by <<to cap>> is meant the shutting/closing of the end of the tubular element e.g. by:

covering the end of the tubular element with a cover comprising an annular peripheral skirt, the cover having a larger diameter than the diameter of the tubular element, pressing into the tubular element at its ends a cover having a smaller diameter than the diameter of the tubular element, the axes of revolution of the cover and of the tubular element being coaxial.

The connecting body comprises one or more portions, each portion being separate from at least one of the storage assemblies.

In the present invention by <<separate from at least one cover>> is meant that not every portion of the connecting body is in a single unit (i.e. in a single piece) with both covers at once.

The connecting body extends between the two storage assemblies so that the height of each storage assembly connected to the connecting body is equal to the height of a storage assembly devoid of connecting body (i.e. not connected to the connecting body). The height of the assembly is the dimension thereof along the axis of its tubular element.

Preferably the term main direction is given to the direction joining the two storage assemblies once assembled, and the assemblies are configured so that the connecting body extends between the storage assemblies so that, in a secondary direction perpendicular both to the direction of the axis and to the main direction, the dimension of each storage assembly connected to the connecting body is equal to the dimension in this direction of a storage assembly devoid of connecting body (i.e. not connected to the connecting body).

In other words, the dimension in the secondary direction of the two joined storage assemblies provided with the connecting body is equal to the dimension in this direction of the storage assembly of largest dimension. In the ideal case in which there is no dispersion between the dimensions of the assemblies, the dimension of the joined assemblies in this direction is equal to the dimension of one assembly.

In this manner the bulk of the joined assemblies is minimized and it is possible to maximize the volume capacity of the energy storage module.

Preferred but non-limiting, aspects of the module according to the invention are the following:

the connecting body (in particular the tongue of an assembly cover) is intended to be in contact with:

the cover of at least one other of the storage assemblies; and/or the tubular element of at least one another of the storage assemblies to connect the connecting body electrically with the other of the storage assemblies;

the connecting body comprises at least one contact face intended to come into contact with the cover or with the tubular element of at least one of the storage assemblies, the contact face having a shape mating with the shape of the cover or of the tubular element;

the connecting body comprises two tongues each forming a portion of the connecting body, each tongue being in a single piece with a cover of each assembly, said tongues being positioned on the assemblies so that they are superimposed when said assemblies are electrically connected. This embodiment is implemented when the two joined assemblies conform to the invention. It facilitates the assembly method since it only requires a single connecting step (between the two portions of the connecting body) whilst making the connection simpler since the configuration of the connecting surface is not imposed by the shape or by the position of the cover or of the tubular element;

it is noted that the tongues of the two assemblies may not be of the same thickness. One of the tongues forming the connecting body—e.g. the tongue the furthest away from the covering walls of the covers—may be thicker than the other of the tongues forming the connecting body, which can facilitate the connection between the two tongues irrespective of the type of connection chosen, in particular when this connecting is via welding e.g. friction stir welding;

the corresponding tubular element may have a cut-out whose shape matches the cross-section of the tongue, which allows the tongue to protrude from the assembly and to come into contact with the other assembly, even if provision is made for the cover to be pressed inside the tubular element;

the cover of at least one assembly may also comprise a peripheral skirt extending over the periphery of the covering wall of the cover and being intended to surround the side face of the tubular element, in this case one tongue of the connecting body can be arranged on the skirt and extend outwardly for example perpendicular to the peripheral skirt. It will be noted that this embodiment and the preceding embodiment can be combined, the configuration of the different covers of the module not necessarily being identical;

each portion of the connecting body, in particular each radial tongue, is connected to the assembly from which it is separate via welding, preferably via friction stir welding. This type of welding is easy to recognize on the finished part since the trace of the rotating tool at the interface of the two parts can be seen (the material having solidified in this manner).

The invention also concerns a method for assembling a module comprising at least two electrical energy storage assemblies, each storage assembly comprising:

a tubular element having a so-called side face;

at least one cover intended to cap one of the ends of the tubular element, the cover comprising a covering wall intended to cover said end of the tubular element, at least one assembly being an assembly of the invention, the radial tongue of the or of at least one of the assemblies forming the or one portion of the connecting body, the method being noteworthy in that it comprises a positioning and contacting step of at least one portion of a connecting body, namely the radial tongue, said body comprising at least one portion, each portion being separate from at least one assembly, so as to connect the two storage assemblies electrically.

The connecting body (composed of one or more radial tongues of a cover according to the invention) is positioned between the two storage assemblies so that the height of the storage assembly connected to the connecting body is equal to the height of a storage assembly not connected to a connecting body.

In other words, the method comprises a step to position and place in contact one contact face of a radial tongue of a cover of an assembly according to the invention with the other assembly.

Preferred but non-limiting aspects of the assembling method according to the invention are the following:

the method further comprises a securing step to secure each portion of the connecting body i.e. each tongue to the storage assembly or assemblies from which it is separate;

the securing step is a welding step, in particular a friction stir welding step;

if the contact face of the cover is concave and is positioned at the free end of the tongue, it is connected to the side wall of the other assembly;

if the contact face of the cover is positioned on a wall essentially parallel to the covering wall, it is connected to a corresponding contact face of a tongue of another cover according to the invention of the other assembly.

PRESENTATION OF THE FIGURES

Other characteristics, objects and advantages of the present invention will become further apparent from the following description which is solely illustrative and non-limiting and is to be read in connection with the appended drawings in which:

FIGS. 3 and 4 illustrate different examples of the positioning of a connecting body according to the invention;

DESCRIPTION OF THE INVENTION

A description will now be given of different embodiments of the module according to the invention with reference to the Figures. In these different Figures equivalent elements of the module carry the same reference numbers.

Figure 2:
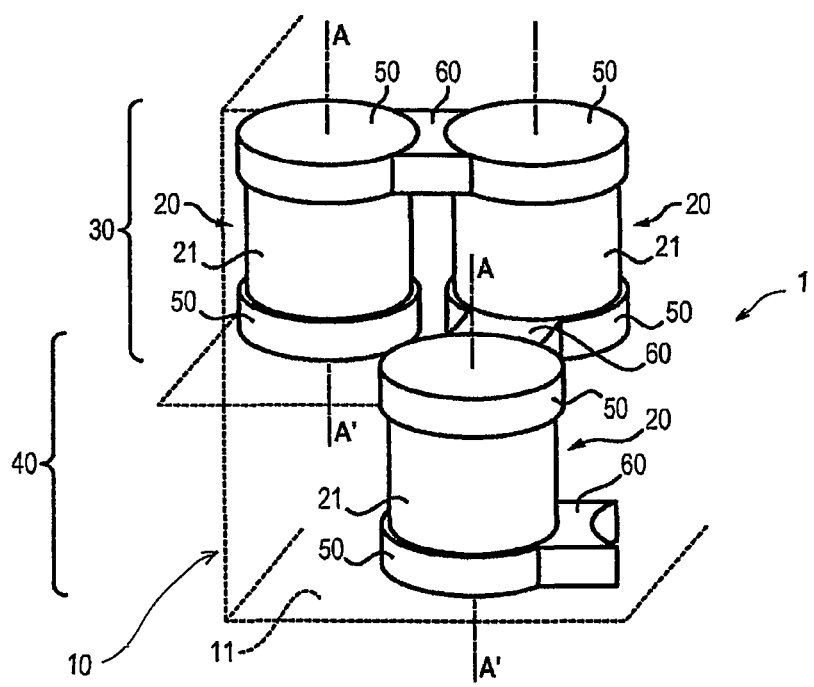
FIG. 2 illustrates an example of a module according to the invention.

As illustrated in FIG. 2, the module 1 comprises a casing 10 in which there are arranged at least two electrical energy storage assemblies 20. More specifically, the module comprises three storage assemblies arranged on several levels.

The storage assemblies 20 are of globally cylindrical shape. In other variants not illustrated herein the storage assemblies may be of parallelepiped, cubic, oval, hexagonal shape without affecting the general principles of the invention.

A first level 30 of the module comprises two storage assemblies 20 arranged side by side in a casing 10. A second level 40 of the module comprises a third energy storage assembly 20.

The axes of revolution A-A' of the storage assemblies 20 are parallel. In the embodiment illustrated in FIG. 2, the storage assemblies 20 are arranged so that their axes of revolution A-A' are perpendicular to the lower wall 11 of the casing 10.

Each storage assembly 20 comprises a tubular element 21 and a capacitor element (not illustrated) in the tubular element 21.

The constituent material of the tubular element 21 may be electrically insulating—e.g. a plastic—an electrically conductive e.g. a metal such as aluminium, stainless steel etc.

The tubular element 21 may be open at its two ends or it may have a bottom. In the embodiment illustrated FIG. 2, each tubular element 21 has two openings on is upper and lower faces.

Each open face of the tubular element 21 is capped by a cover 50 electrically connected to the energy storage assembly 20 along the weld generating lines. The cover 50 is electrically conductive. The constituent material of the cover 50 is a metal for example such as aluminium, stainless steel, etc.

Each cover 50 is composed of:
- a covering wall 51, 52, intended to cover the upper face 24 (respectively lower face 22) of its associated storage element 20, and
- a peripheral skirt 53, 54 intended partly to surround the side face 23 of the tubular element 21.

Figure 1:
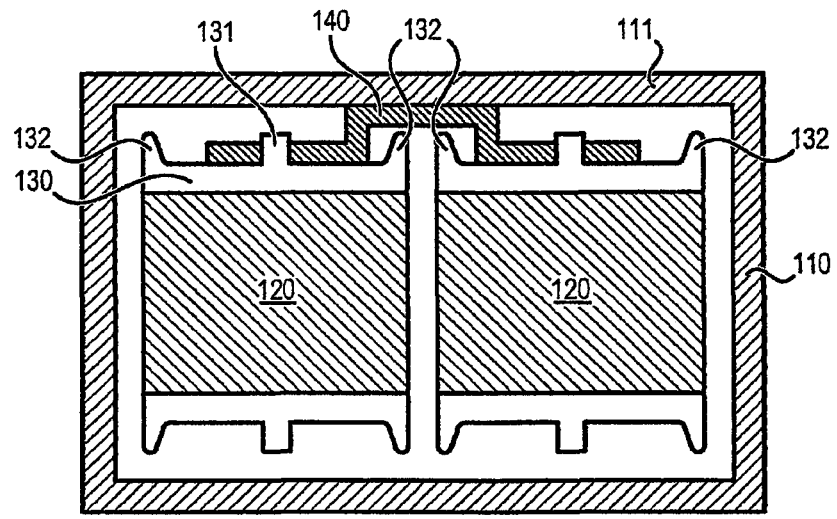
FIG. 1 illustrates one embodiment of a prior art module.

Each cover 50 may or may not comprise a peripheral edge (such as the peripheral edge 132 illustrated in FIG. 1) extending outwardly parallel to the axis of revolution A-A' of the storage assembly on its face opposite the peripheral skirt.

The module also comprises three connecting bodies 60 which will be described in more detail further on.

One particular aspect of the module of the invention is that the connecting body 60 and the covers 50 are connected via welding at the skirt 53, 54 of each cover 50. The welding technique may be transparent laser or edge-to-edge laser or preferably friction stir welding (FSW).

By transparent laser welding is meant the fact that two superimposed parts are welded with an energy beam passing through one of the parts to be welded—either through a thinned portion thereof if the part is thick or through the entire thickness if the part is thin.

By edge-to-edge laser welding is meant the fact that two parts positioned edge to edge are welded using an energy beam that is not a through beam but is adjusted to the shape of the edges to be welded and positioned with precision at the interface of the edges to be welded.

The invention such as defined in the present application applies solely to the case in which the connecting bodies are in a single piece with one of the covers and are welded to the other cover.

With reference to FIGS. 3 and 4 different examples of are given of the connecting of two adjacent storage assemblies 20 using a connecting body 60. In these embodiments, the connecting body 60 is advantageously positioned between the storage assemblies 20 so that the height of the storage assembly connected to the connecting body is equal to the height of a storage assembly not connected to a connecting body.

The connecting body 60 is electrically conductive. The constituent material of the connecting body 60 is a metal for example such as aluminium, copper etc.

In the embodiment illustrated in FIG. 3, the connecting body 60 is in contact with the upper covers 50 of the storage assemblies 20 to be electrically connected. More specifically the connecting body 60 is in contact with the covers 50 at their respective skirts 53, 54. In the present invention the connecting body is in one piece with the skirt 53, 54 of one of the covers and connected by welding to the other of the covers.

Therefore contrary to the prior art modules, two adjacent storage assemblies 20 are not connected using a connector strip 131 arranged ON the covers 50 but using a connecting body 60 arranged BETWEEN the covers.

More specifically, the connecting body 60 is in contact:
- with the covers at their peripheral skirt; and/or
- with the tubular elements of the storage assemblies at their side wall 23.

In the present invention the connecting body is in a single piece with a cover of an assembly and is secured so as to be in contact with the cover or tubular element of the other assembly.

This makes it possible to minimize the height of two adjacent electrically connected storage assemblies and hence to maximize the compactness of the module thus obtained.

If the body allows the connecting of two identical ends (upper or lower of the same assembly, as is the case for the two assemblies in FIG. 3, located on the same stage 30 of the module, the height of the two joined assemblies is equal to the height of each assembly (in the ideal case in which the assemblies have the same dimensions).

In the embodiment illustrated in FIG. 4, the tubular element 21 of each storage assembly 20 comprises a bottom 25. Each storage assembly 20 comprises a single cover 50 intended to cap the upper open face of the tubular element 21. The connecting body 60 is firstly in contact (in the invention being in a single piece) with the upper cover 50 of a storage assembly 20 and secondly with the lower part of the tubular element 21 of an adjacent storage assembly.

If the body allows the connecting of an upper end of one assembly and the lower end of another assembly as is the case in FIG. 4, for assemblies belonging to two different levels 30; 40 of the module, the height of the two joined assemblies is shorter than the sum of the heights of the assemblies.

Other configurations could also be envisaged for example in which the body connects one end of one assembly with a median part of another assembly.

It will be noted that the connecting body is configured in each of the cases illustrated herein so that the bulk of the two joined assemblies joined via this body is minimal, both in height and in width (namely in a direction perpendicular to the axis of the assemblies and to the direction connecting these axes). The body is effectively configured so that in this direction the dimension of the two joined assemblies is equal to the dimension of one assembly if the ideal case is considered in which all the assemblies have the same dimensions. In other words, the dimension of the connecting body does not exceed the diameter of the assembly.

Figure 5:
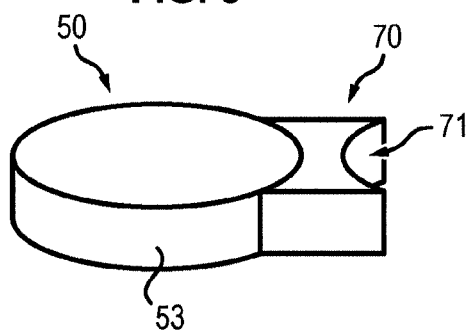
FIGS. 5 to 7 illustrate different embodiments of the connecting body according to the invention.

With reference to FIG. 5 one embodiment is illustrated of a connecting body 60. In this embodiment the connecting body 60 and a cover 50 are a single unit i.e. the cover 50 and the connecting body 60 are made in a single piece.

The cover 50 comprises an annular peripheral skirt 53 and a radial tongue 70 protruding radially on the annular peripheral skirt 53 forming the connecting body. The radial tongue 70 comprises four substantially planar faces and a contact face 71 opposite the cover 50.

The contact face 71 is intended to come into contact with the cover 50 or tubular element 21 of an adjacent storage assembly 20.

The contact face 71 may have shape matching the shape of the cover 50 or of the tubular element 21 with which it is intended to come into contact, e.g. a concave shape.

It has a profile substantially in an arc of a circle along a cross-section parallel to the upper face 61 of the connecting body 60. Therefore the shape of the contact face matches the shape of the skirt of the cover or of the tubular element on which it is intended to be secured, and the contact surface between the assembly and the connecting body is maximized. This makes it possible to increase the contact surface between the connecting body 60 and the storage assemblies 20 and hence to reduce the electrical resistance of the module.

To maximize this contact surface between the connecting body 60 and the storage assemblies 20 whilst minimizing the bulk of the module:

the height of each contact face 71 can be chosen to be equal to the height h of the skirt 53, 54 of a cover 50, and/or the width w of the connecting body 60 can be chosen to be equal to the diameter of the tubular element 21 or of the cover 50 with which said body is intended to come into contact.

The reader will appreciate that the contact face(s) of the connecting body 60 may have profiles other than a profile in an arc of a circle.

For example each contact face of the connecting body 60 may have a dove-tailed or serrated profile etc.

In addition, each contact face of the connecting body may comprise a male-shaped (respectively female-shaped) cradle intended to be secured onto a support of female (respectively male) shape of the storage assembly.

It is thereby mechanically possible to secure the connecting body onto the storage assembly either by interlocking or by press-fit or any other type of mechanical fastening known to persons skilled in the art. For example the cradle of the contact face may comprise a tenon (respectively a mortise) and the support of the storage assembly may comprise a mortise (respectively a tenon).

Figure 6:
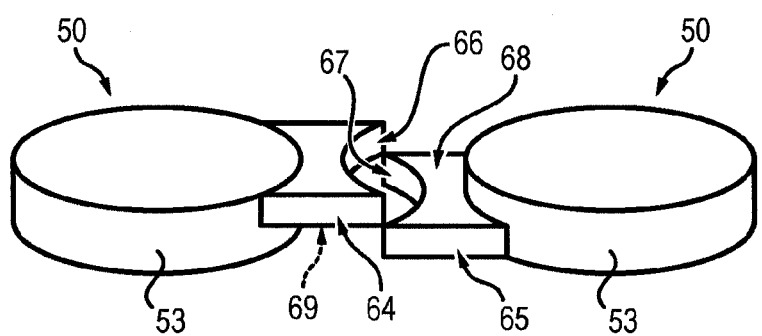

With reference to FIG. 6 an illustration is given of another embodiment of the connecting body. In this embodiment each cover 50 comprises a radial tongue 64, 65 extending outwardly from the annular peripheral skirt 53 parallel to the upper face of the cover. The radial tongue of each cover forms a portion of the connecting body. Each of the tongues 64, 65 comprises a concave contact face 66, 67 opposite the cover 50. Each contact face 66, 67 is intended to come into contact with the cover of an adjacent storage assembly. The height of the radial tongue is equal to or shorter than one half of the height of the skirt.

One first type of cover comprises a flush radial tongue 64 (i.e. extending in the continuation of the covering wall of the cover 50).

A second type of cover comprises a radial tongue 65 extending at the free end of the annular peripheral skirt 53, parallel to the covering wall 51, 52 of the cover 50. Therefore the shapes of the two types of covers are matching shapes. To connect two adjacent storage assemblies electrically, a cover of the first type is used on one of the two storage assemblies, and a cover of the second type on the other storage assembly. These covers are positioned so that the radial tongues of the covers of the first and second type are superimposed, the lower surface 69 of the upper tongue 64 resting on the upper surface 68 of the lower tongue 65.

By superimposing the radial tongues it is possible to facilitate the welding operation. Advantageously, the radial tongues 64, 65 can be welded together at the surfaces 68, 69.

It will be noted that the thickness of the lower tongue 65 is preferably greater than the thickness of the upper tongue 64. In this case it may form a support allowing the welding of the tongues 64, 65 without damaging the connecting body.

It is thereby possible to maximize the exchange surface between the radial tongues 64, 65 and hence to minimize the electrical resistance of the connecting body.

Figure 7:
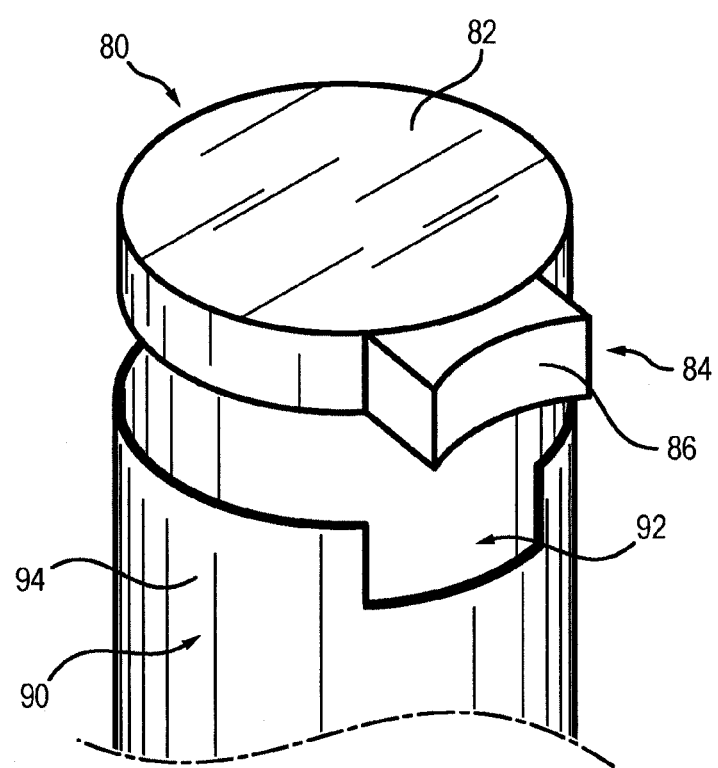

Another variant of embodiment of the invention is also illustrated in FIG. 7. In this Figure, the cover 80 has a shape that differs from everything described previously. The cover is formed of an essentially planar disc 82 and does not comprise a peripheral skirt. The dimensions of the disc 82 are smaller than the dimensions of the end of the tubular elements 90, and it is therefore inserted into the tubular element so that the upper surface of the cover 80 lies flush with the end of the tubular element.

The cover also comprises a radial tongue 84 whose height is equal to the height of the disc 82. The tongue 84 comprises a contact face 86 intended to be connected to a second assembly as described previously.

It is also noted that the tubular element 90 comprises a cut-out 92 in its side wall 94 allowing the radial tongue to project from the tubular element 90 and to connect the assembly to a second adjacent assembly.

It will be noted that the shape of the cover described with reference to FIG. 7 can be adopted even if the tubular element does not comprise a cut-out. In this case the cover is placed on the end of the tubular element.

To summarize and with reference to FIGS. 5 to 7, the connecting body can be made in one (FIG. 5 or 7) or two parts (FIG. 6) one and/or the other of these parts possibly being in a single piece with one of the covers.

However, irrespective of the configuration of the connecting body, it is never in a single piece with two covers at the same time. This allows improved flexibility for assembling of the module.

A more detailed description will now be given of an example of method.

If the tubular element 21 does not comprise a bottom, a cover 50 is arranged on one of the faces of the tubular element.

A capacitor element 80 is positioned inside the tubular element 21. A cover 50 is placed on the open end of the tubular element then, once the connection between the tubular element 21 and the cover 50 has been sealed, the electrolyte is placed in the tubular element.

A first electrical energy storage assembly is thereby obtained. These steps are repeated to obtain the number of desired storage assemblies for the module. At least one of the covers of each assembly comprises a radial tongue forming a connecting body such as described in FIG. 5;

At a step of the assembling method, two energy storage assemblies are positioned side by side.

The connecting body 60 is placed in contact with the skirt of the energy storage assembly 20 from which it is separate to connect this assembly electrically with the assembly with which the body is in a single piece. Advantageously, the connecting body is positioned so that the height of the storage assembly connected to the connecting body is equal to the height of a storage assembly not connected to the connecting body.

The connecting body is secured onto the two storage assemblies in the invention by connecting the cover tongue, which forms a connecting body, at its contact surface with the other storage assembly. This securing can be obtained by gluing, screwing, welding or interlocking of mating parts provided on the covers and on the connecting body. Welding and in particular friction stir welding is the preferred embodiment since it allows better passing of current.

These different steps can be repeated to connect a plurality of storage assemblies electrically to form modules having different properties in relation to the intended application, such as illustrated in FIG. 2 for example.

The assembling of a module using the connecting body described above has numerous advantages:

the different configurations of the connecting body allow good flexibility of two joined adjacent storage assemblies, at different heights and at different angles, since the connecting body is not in a single piece with the covers of both storage assemblies;

the joining of two storage assemblies can be obtained using standard parts irrespective of the assembled configuration of the adjacent storage assemblies (storage assemblies positioned on different levels and/or at different angles etc.);

since the parts used for joining are of simple, standard shape the manufacturing costs thereof (and hence of the module) are low;

the connecting bodies allow maximized compactness of the module. Since they are integrated in the cover it is possible to simplify the assembling method which only requires a single connecting step of the assemblies;

the use of a connecting body also allows improved heat evacuation; in the prior art modules in which a strip is superimposed over the cover, heat is only evacuated via the weld beads connecting the strip to the cover; on the contrary, with the use of a connecting body, heat is evacuated through the entire upper surface of the cover which is directly in contact with surrounding air;

finally, the use of a connecting body according to the invention allows a reduction in the resistance of the module, the distance covered by the electric current in a module according to the invention being shorter than the distance travelled by the electric current in a module whose assemblies are connected via a connector strip superimposed over the cover.

The reader will have understood that numerous modifications can be made to the method and device described in the foregoing without departing in substance from the novel teachings and advantages described herein.

In particular the tubular element, the cover or the connecting body can be of different shapes to those illustrated in the Figures. For example, the connecting body may be a rod or may comprise a contact face whose shape does not match the shapes of the assembly.

Therefore, any modifications of this type come within the scope of the invention such as defined in the appended claims.

The invention claimed is:

1. A cover intended to cap a tubular element of a first electrical energy storage assembly, the cover comprising a covering wall and at least one side wall essentially normal to the covering wall, wherein the cover comprises an electrically conductive radial tongue arranged on said at least one side wall, said tongue extending radially on its entire length from said side wall, said radial tongue having a contact face located at a free end of the radial tongue, essentially normal to the covering wall and of a concave shape, said contact face being intended to come into contact and to match with the cover or a tubular element of a second adjacent storage assembly to connect the two storage assemblies electrically together.

2. The cover according to claim 1 also comprising a peripheral skirt extending over the periphery of the covering wall, the radial tongue being arranged on the peripheral skirt.

3. The cover according to claim 1 forming a disc comprising the covering wall, the radial tongue being arranged on a side wall of the disc.

4. The cover according to claim 1, wherein the ends of the radial tongue in a direction normal to the covering wall are located between the ends of the remainder of the cover in this direction.

5. The cover according to claim 4, wherein the ends of the radial tongue in at least one other direction along the plane of the covering wall are located between the ends of the covering wall in this direction.

6. An energy storage assembly comprising a tubular element having a side face and at least one cover intended to cap one of the ends of the tubular element, the cover comprising a covering wall intended to cover said end of the tubular element and at least one side wall essentially normal to the covering wall, the cover comprising an electrically conductive radial tongue arranged on said at least one side wall, said tongue extending radially on its entire length from said side wall, said radial tongue having a contact face located at a free end of the radial tongue, essentially normal to the covering wall and of a concave shape, said contact face being intended to come into contact and to match with the cover or a tubular element of a second adjacent storage assembly to connect the two storage assemblies electrically together.

7. The assembly according to claim 6, wherein the cover forms a disc comprising the covering wall, the radial tongue being arranged on a side wall of the disc, and is intended to be inserted in the tubular element, the tubular element comprising a cut-out whose shape matches the shape of the cross-section of the radial tongue in its side wall to allow the radial tongue to pass.

8. The assembly according to claim 6 wherein the cover comprises a peripheral skirt extending over the periphery of the covering wall, the radial tongue being arranged on the peripheral skirt, the peripheral skirt being intended to surround the side face of the tubular element.

9. A module comprising at least two electrical energy storage assemblies, wherein at least one of the assemblies is an assembly comprising a tubular element having a side face and at least one cover intended to cap one of the ends of the tubular element, the cover comprising a covering wall intended to cover said end of the tubular element and at least one side wall essentially normal to the covering wall, the cover comprising an electrically conductive radial tongue arranged on said at least one side wall, said tongue extending radially on its entire length from said side wall, said radial tongue having a contact face located at a free end of the radial tongue, essentially normal to the covering wall and of a concave shape, said contact face coming into contact, matching with and being secured with the cover or with the tubular element of a second adjacent storage assembly to connect the two storage assemblies electrically together, the or at least one of the radial tongues of said cover or covers forming a connecting body allowing the electrical connection of the two assemblies.

10. The module according to claim 9, wherein the storage assembly or assemblies are configured so that the connecting body extends between the two storage assemblies so that the height of each storage assembly connected to the connecting body is equal to the height of a storage assembly not connected to a connecting body.

11. The module according to claim 9 wherein the two storage assemblies comprise a tubular element having a side face and at least one cover intended to cap one of the ends of the tubular element, the cover comprising a covering wall intended to cover said end of the tubular element and at least one side wall essentially normal to the covering wall, the cover comprising an electrically conductive radial tongue arranged on said at least one side wall, said tongue extending radially on its entire length from said side wall, said radial tongue having a contact face located at a free end of the radial tongue, essentially normal to the covering wall and of a concave shape, said contact face coming into contact, matching with and being secured with the cover or with the tubular element of a second adjacent storage assembly to connect the two storage assemblies electrically together, and wherein the connecting body comprises two radial tongues each forming a portion of the connecting body, each radial tongue being in a single piece with a cover of each respective assembly, said radial tongues being positioned on the assemblies so that they are superimposed during the electrical connecting of said assemblies.

12. The module according to claim 11, wherein one of the radial tongues forming the connecting body is thicker than the other of the radial tongues forming the connecting body.

13. The module according to claim 11 wherein each portion of the connecting body is connected to the assembly from which it is separate, via welding.

14. The module according to claim 11, wherein each cover of each assembly forms a disc comprising the covering wall, the radial tongue being arranged on a side wall of the disc, and is intended to be inserted in the tubular element, the tubular element comprising a cut-out whose shape matches the shape of the cross-section of the radial tongue in its side wall to allows the radial tongue to pass.

15. The module according to claim 11, wherein each cover of each assembly comprises a peripheral skirt extending over the periphery of the covering wall, the radial tongue being arranged on the peripheral skirt, the peripheral skirt being intended to surround the side face of the tubular element.

16. The module according to claim 9, wherein the at least one cover of the assembly forms a disc comprising the covering wall, the radial tongue being arranged on a side wall of the disc, and is intended to be inserted in the tubular element, the tubular element comprising a cut-out whose shape matches the shape of the cross-section of the radial tongue in its side wall to allows the radial tongue to pass.

17. The module according to claim 9, wherein the at least one cover of the assembly comprises a peripheral skirt extending over the periphery of the covering wall, the radial tongue being arranged on the peripheral skirt, the peripheral skirt being intended to surround the side face of the tubular element.

18. A method for assembling a module comprising at least two electrical energy storage assemblies wherein at least one assembly comprises a tubular element having a side face and at least one cover intended to cap one of the ends of the tubular element, the cover comprising a covering wall intended to cover said end of the tubular element and at least one side wall essentially normal to the covering wall, the cover comprising an electrically conductive radial tongue arranged on said at least one side wall, said tongue extending radially on its entire length from said side wall, said radial tongue having a contact face located at a free end of the radial tongue, essentially normal to the covering wall and of a concave shape, said contact face being intended to come into contact and to match with the cover or with a tubular element of a second adjacent storage assembly to connect the two storage assemblies electrically together, the radial tongue such that its contact face comes into contact, matches with the cover or with the tubular element of the second adjacent storage assembly of a cover of the assembly forming the or one portion of a connecting body, wherein the method comprises positioning the radial tongue so as to join the two storage assemblies for the electrical connection thereof, and then a securing step of each contact face for the connecting thereof with the storage assembly from which it is separate.

19. The method according to claim 18, wherein the securing step is a welding step.

* * * * *